Nov. 29, 1927.

G. S. BAKER 1,651,243

MACHINE FOR USE IN THE MANUFACTURE OF BISCUITS

Original Filed Feb. 8, 1922   4 Sheets-Sheet 1

INVENTOR
George Samuel Baker.

ATTORNEY

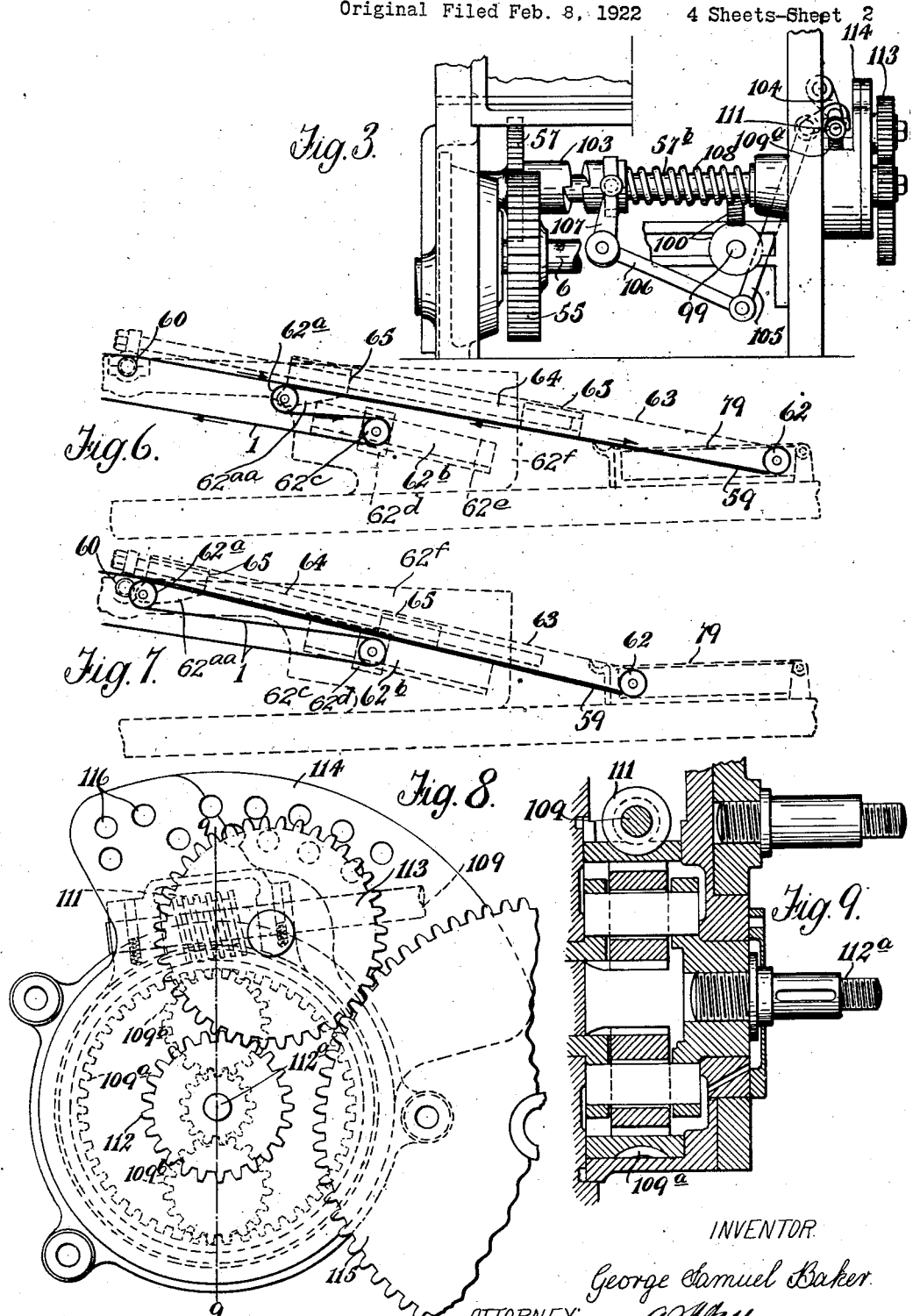

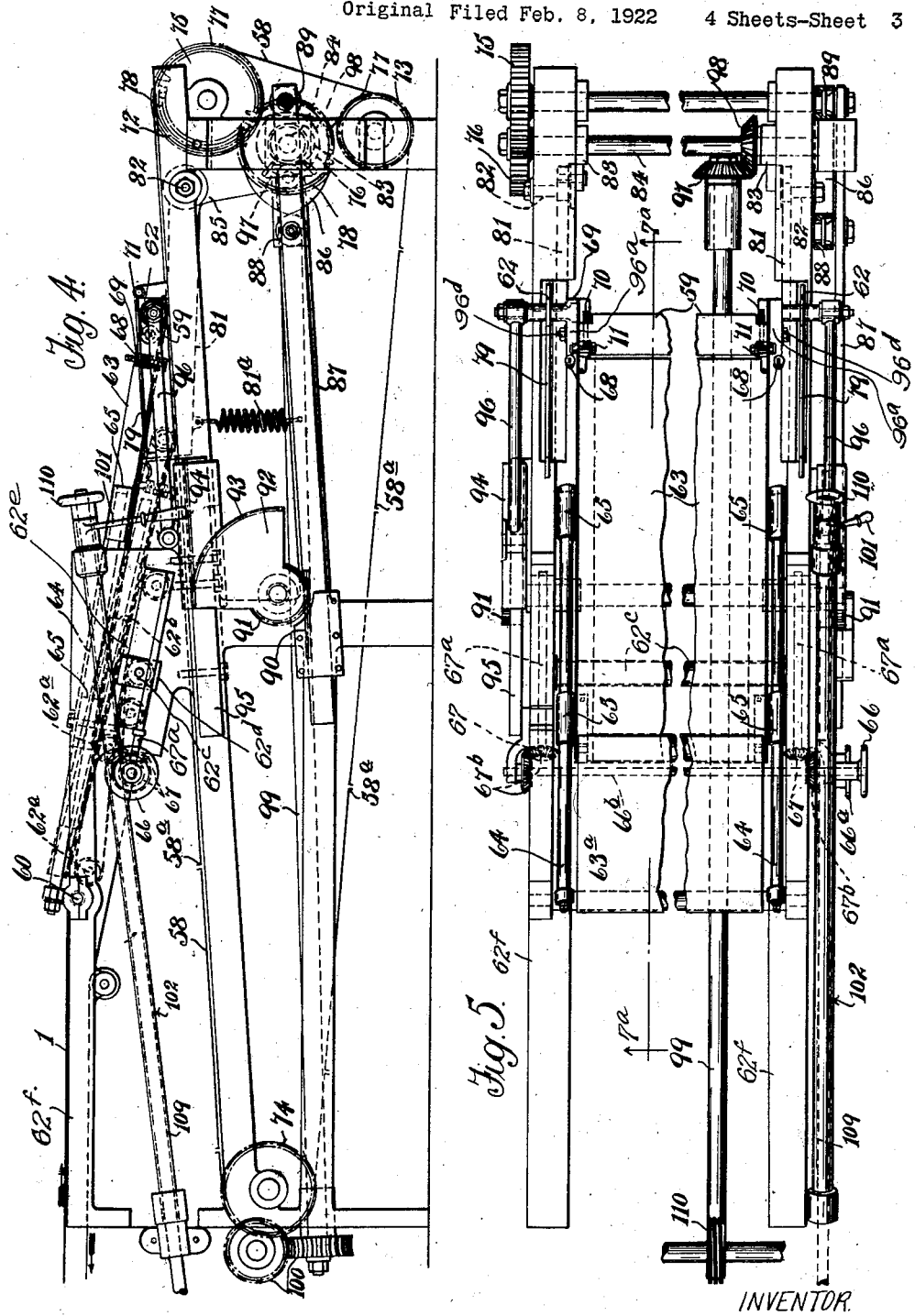

INVENTOR:
George Samuel Baker.

Patented Nov. 29, 1927.

1,651,243

UNITED STATES PATENT OFFICE.

GEORGE SAMUEL BAKER, OF LONDON, ENGLAND, ASSIGNOR TO BAKER-PERKINS CO. INC., OF SAGINAW, MICHIGAN, A CORPORATION OF NEW YORK.

MACHINE FOR USE IN THE MANUFACTURE OF BISCUITS.

Original application filed February 8, 1922, Serial No. 534,910, and in Great Britain February 16, 1921. Divided and this application filed August 4, 1924. Serial No. 730,113.

This invention relates to machines for use in the manufacture of biscuits and the like and more particularly of the general class in which a sheet of dough, paste or similar substance is passed on a conveyor or web over a table beneath a series of combined cutters and embossers which may serve also as ejectors and is conveyed thence by said conveyor to be delivered to pans or equivalents in which they are delivered to an oven or otherwise dealt with.

Cutting embossing and ejecting mechanism such as described forms the subject matter of my concurrent application Serial No. 534,910 of which the present application is a division the subject matter of this present application relating to the means for feeding the cut biscuits from the delivery conveyor to the pans, controlling the movements of the latter in relation to said conveyor and in relation to the cutting mechanism.

The essential features of the invention and combinations of parts involved therein are specifically set forth in appended claims and hereinafter fully described with reference to the accompanying drawings certain figures of which show parts of the cutting mechanism of the application 534,910 aforesaid associated with the features of the present invention.

Figure 1:
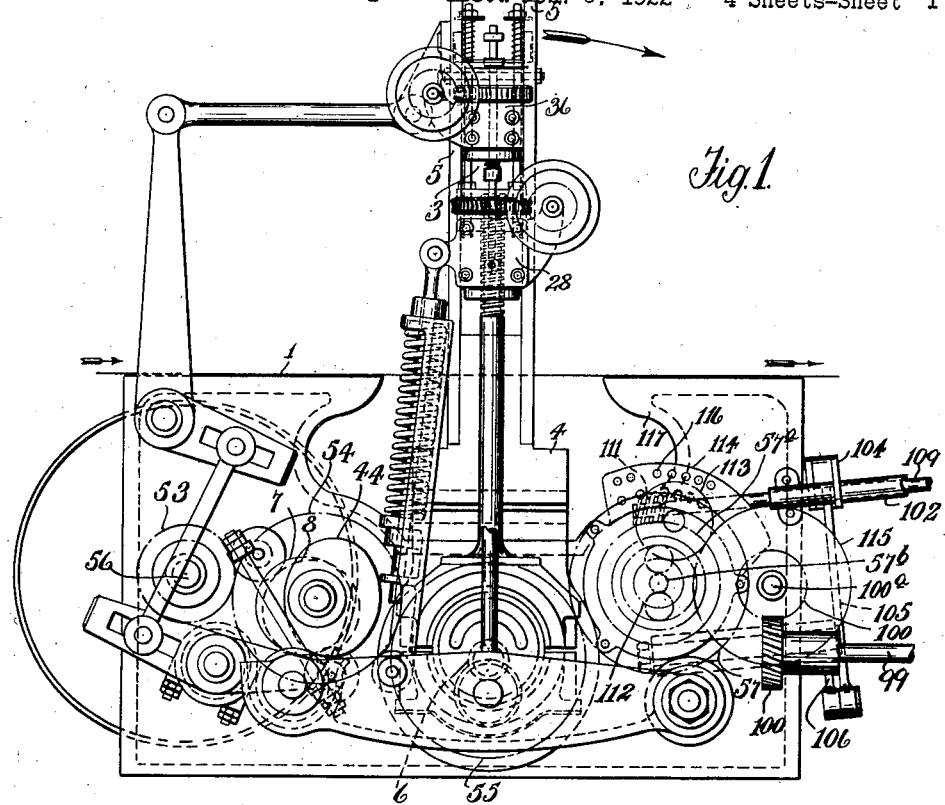
Figure 2:
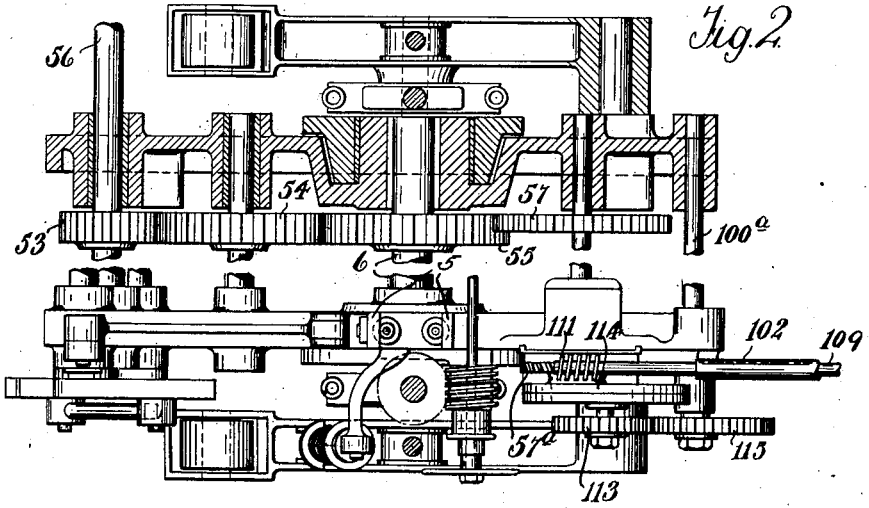
Figure 7A:
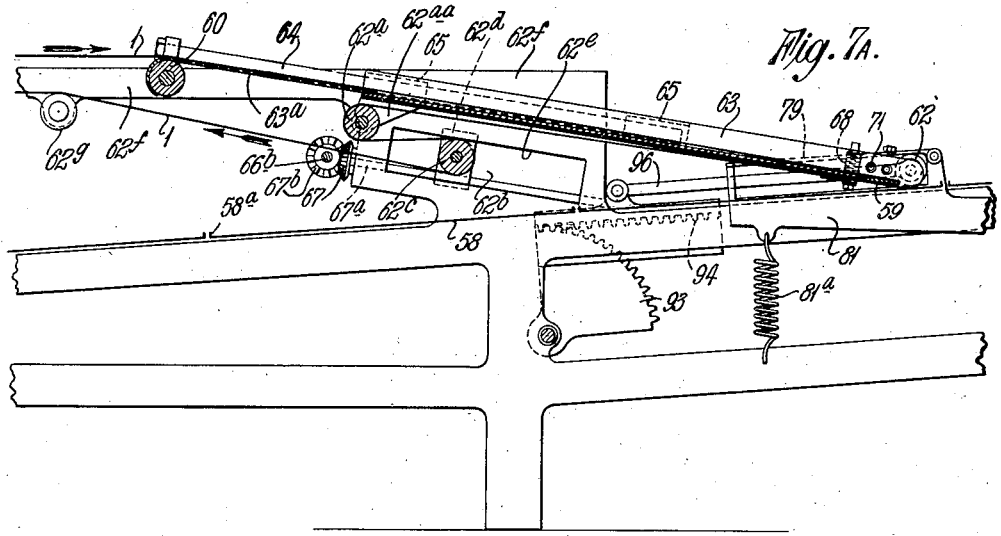
Figure 7B:
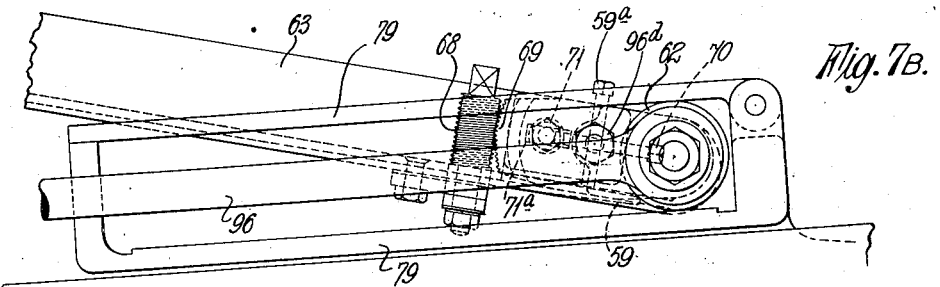
Figure 7C:
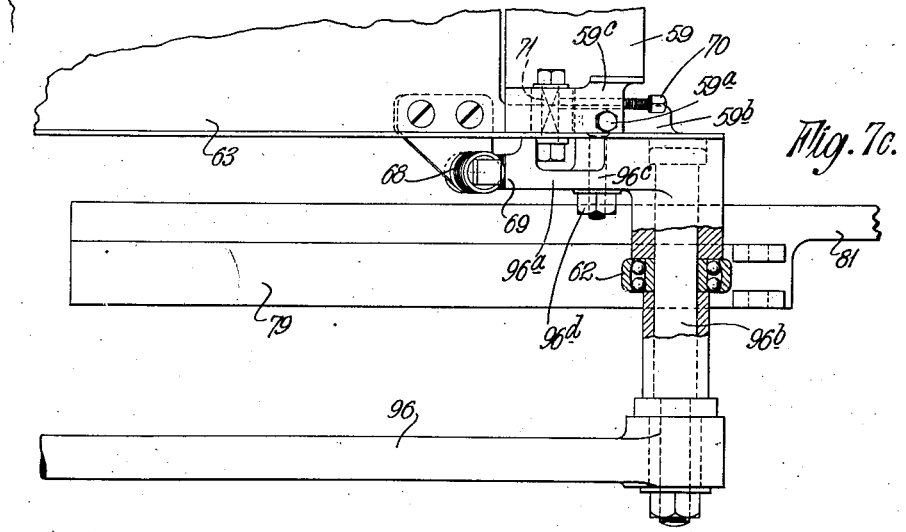

In said drawings:

Fig. 1 is a side elevation of the cutting mechanism with associated epicyclic gearing by which the pan conveyor is driven. Fig. 2 is a partial plan of Fig. 1 and partial sectional plan thereof. Fig. 3 is an end elevation of clutch mechanism and associated parts cooperating with the epicyclic gearing.
Fig. 4 is a side elevation of the panning mechanism. Fig. 5 is a plan view of Fig. 4 with certain parts omitted, Figs. 6 and 7 are diagrammatic views showing in two positions the conveyor which conveys the cut biscuits to the panning mechanism. Fig. 7$^a$ is a section on an enlarged scale on line 7$^a$—7$^a$ of Fig. 5. Fig. 7$^b$ is a detail view on an enlarged scale showing the right hand end of the slide 63 and associated parts.
Fig. 7$^c$ is a plan view of Fig. 7$^b$ with parts in section. Fig. 8 is a side elevation of the epicyclic gearing aforesaid and Fig. 9 is a partial section on the line 9—9 of Fig. 8.

In the said drawings 1 designates the conveyor web which carries the sheet of dough. The cutting device include the cutters 2, embossers and ejectors 3 and table 4 are mounted in side frame 5 which are given a rocking movement through a wide arc about the axis of a shaft 6 at the base of the machine.

Cams 7 and 8 and 44 respectively for operating the rocking frames 5 and embosser cross-head 36 and the shaft 6 for operating the cutter cross-head 28 as described in the concurrent application before referred to are driven through a suitable train of spur-gear 53, 54, 55, from a main drive-shaft 56 said gear train being further extended by another gear 57 to actuate an epicyclic gearing 57$^a$ and through the latter control the pan conveyor as will be described later.

After passing from under the cutter head, the sheet of dough is conveyed by the web 1 to the panning portion of the machine illustrated in Figs. 4 to 7 where the cut and ejected biscuits, after disposal of the scrap in any approved manner, are delivered to the pans, trays or equivalents, which are moved along on a continuously moving "pan" conveyor 58 below the delivery end of the web 1 conveying the cut biscuits. The said web first passes over a stationary plate 63$^a$ which is supported at its rearward end by being hooked about a stud or shaft 60 extending between the side frames 62$^f$ of the machine. The said plate rests loosely at its forward end on a reciprocating carriage or slide 63 of channel section over which the web then passes. This slide is provided with lateral sleeves 65 (Figs. 4 and 5) which embrace stationary guide rods 64 at each side of the machine and is reciprocated by means of a toothed segment 93 meshing with a rack 94 (one at each side) guided in a side frame and connected to a rod 96 which in turn is attached to a bracket 96$^a$ (Fig. 7$^c$) by means of a bolt 96$^b$, the bracket in turn being connected to the slide by a stud 96$^c$ which extends through one of the side flanges of the slide and is secured by a nut 96$^d$. The slide carries at its forward end a knife edge 59 about which passes the web, the latter then returning and being passed about a roller 62$^a$ mounted in a bracket 62$^{aa}$ carried by the slide, and thence about another roller 62$^c$ mounted on a block 62$^d$ which is adjustable in a slot 62$^e$ in the side frame member 62ᶠ. From said roller 62ᶜ the web passes back over a guide roller 62ᵍ to the cutting mechanism. The roller 62ᶜ is adjustable in the slot 62ᵉ by means of a rod 67ᵃ and bevel wheels 67, 67ᵇ the latter being mounted on a shaft 66ᵇ carrying hand wheels 66, 66ᵃ (one for single and the other for double adjustment) so that any slack in the web 1 may be taken up.

The aforesaid bolts 96ᵇ carry rollers 62 which run in slotted guides 79 and thus keep the movements of the slide in a rectilinear path.

By the construction above described the delivery end of the web passing about the knife edge 59 is thus caused to advance (Figs. 6 and 7ᵃ) and recede (Fig. 7) whilst the web remains taut throughout.

The knife edge 59 is mounted for angular adjustment in relation to the slide 63 by means of a segment 69 and screw 68.

The knife edge 59 is adjustable longitudinally to further take up any slack of the web 1 by passing the bolt 71 through a slot 71ᵃ in a flange 59ᶜ of the knife edge and locking it in required position in said slot by means of a bolt 70.

The adjusting means described are shown in Fig. 5 as provided at both sides of the machine.

The operation of the machine at this point is as follows: The knife edge 59 advances at the same speed as the web 1 carrying the biscuits, so that during this forward travel of the knife edge, to the right in Fig. 5, no biscuits are delivered from the web to the pans on the conveyor 58 the web being in the position shown in Fig. 6. At the forward end of the stroke of said knife edge the pan conveyor 58 is so adjusted that the front edge of a pan is immediately below the delivery point of the web. The knife edge now commences to recede (to the left in Fig. 5) the pans meanwhile moving forward at the same speed as the web 1 and the result is that the biscuits are peeled from the web onto the pan until it is filled with biscuits, this occurring when the web has reached the position shown in Fig. 7. The knife edge will then once more advance (to the right) and during this forward travel and while no panning is taking place, the pans on conveyor 58 are caused to move faster than the speed of the web 1. In this way the pans will have been skipped forward so that when the next panning or receding stroke of the knife edge commences, the space between the filled pan and the one following will have been taken up and the knife edge will be in position over the front edge of the next pan to commence the panning stroke.

The pan conveyor passes at the delivery end about sprockets 72 and 73 and thence back to the feed end about a sprocket 74 and is caused to move at the two speeds described above, by being driven through a pair of specially constructed intermeshing gear wheels 75 and 76 the teeth on each of which are constructed on two arcs of different pitch radius as shown at 77 and 78 so that during one part of the revolution the gear ratio is different from that at the other part of the revolution and this causes the driven wheel 75 to move faster at one part of the revolution than at the other for the purpose stated. Any other suitable mechanism may be used to produce the same effect. During delivery the knife-edge is brought as close to the surface of the pan as possible. It is, however, necessary that said knife edge and parts of the web adjacent thereto should be lifted during the forward (right hand) stroke of the knife-edge to permit the driving projections 58ᵃ of the pan conveyor to pass under the knife edge without contact, and for this purpose the guides 79 are carried by side levers 81 adapted to be rocked about pivots 82 at the proper moment, to lift the knife edge as stated. This is effected by cams 83 mounted on shaft 84 which carries the gear wheel 76 before mentioned and acting on arms 85 secured to the side levers 81 or to their pivots. Springs 81ᵃ are provided to maintain the arms in contact with the cams. The shaft 84 on which said cams are mounted may also operate by means of another cam 86, thereon a bar 87 carrying two rollers 88 and 89.

This bar has a toothed portion 90 which meshes with teeth 91 on a segment 92 having also other teeth 93 meshing with a rack 94 on a slide 95 connected by rod 96 to the carriage 63 carrying the delivery end of the web so that the latter and the carriage are reciprocated as previously explained. The segment 93 and rack and slide 94, 95, with rod 96 are duplicated on the other side of the machine.

The drive for the cam shaft 84 is shown as effected by means of bevel gears 97, 98, and a longitudinal shaft 99 actuated through worm gear 100 from the epicyclic gearing previously referred to (see also Fig. 1).

The position at which the biscuits are fed to the pans is the most convenient one for occupation by an operative, since from there said operative may observe whether the panning operation is being properly performed. It is therefore desirable that the panning portion of the machine should be under control for starting and stopping from this position, and for this purpose there is provided a control handle or lever 101 adapted to actuate a hollow rock-shaft 102 which controls a clutch 103 (Fig. 3) whereby the worm gear 100 through the epicyclic gearing 57ᵃ and consequently the driving means for the pan conveyor 58 may be stopped at will whilst the cutting, embossing and ejecting operations still proceed. The hollow rock shaft 102 operates the clutch by means of the lever and link system 104, 105, 106, 107 shown in Figs. 1 and 3.

The clutch is interposed in the main shaft 57$^b$ of the epicyclic gearing 57$^a$ and is under the action of a spring 108. The dogs of the clutch are so constructed, however, that if not held positively out of gear by the means described they will automatically re-engage under the action of the spring 108 at the next revolution of the driving shaft 57$^b$ and allow the pan conveyor 58 to move forward again. By this device the operative may remove defective biscuits from and re-arrange the sound biscuits on the pans so that the latter are completely filled with perfectly formed biscuits.

The epicyclic gearing above referred to is suitably of the type disclosed in Patent No. 1,109,895 and no detail description thereof is here deemed necessary. Adjustment of said gearing to ensure proper synchronization of movement or time relation between the pan conveyor 58 and associated parts relatively to the cutting, embossing and ejecting elements may however also be performed from the aforesaid control position as by means of a rod 109 extending through the rock shaft 102 previously mentioned and rotated by a hand-wheel 110, this rod extending to the gearing (Figs. 1, 8 and 9) and being connected as by worm gear 111 to adjust the parts thereof by the worm gear moving round the sun wheel 109$^a$ of the gear to the required adjusted position with regard to the planet wheels 109$^b$ of the gearing. Thus if the biscuits should overlap the end of the web at the panning position, or should be too far back on the web for proper panning, this can be corrected by the means described.

Between the epicyclic gear and the worm gear 100 driving the panning mechanism, there is provided a train gearing the ratio of which can be varied to alter the number of strokes made by the cutter for each pan filled with biscuits, which regulates the number of rows of biscuits deposited on the pan.

This train of gearing comprises a pinion 112 driven from the epicyclic gear which engages another pinion 113 carried in a quadrant arm 114 arranged to be manually adjusted around the centre 112$^a$ of the first pinion 112 and the epicyclic gearing as a whole.

The pinion 113 carried on the quadrant engages a third "change" gear wheel 115, mounted on the shaft 100$^a$ of one element of the worm gear 100 the size of said wheel 115 depending on the number of rows of biscuits required on the pan. The adjustable quadrant 114 is held in position for the gears to mesh correctly for each speed by a locating pin which is fitted into one of a series of holes 116 drilled in the quadrant and engages some fixed frame part, for example the frame 117 (Fig. 1) at the rear of the quadrant.

In the claims which follow the terms "biscuits" and "dough" are held to include any like product, or material from which such product is produced, within the capabilities of the mechanism forming the subject matter of said claims.

What I claim as my invention and desire to secure by Letters Patent of the United States is:—

1. In a machine for the manufacture of biscuits and the like, having a continuously moving feed web for cut biscuits, means for giving the delivery end of said web advancing and receding movements and a telescopic carriage supporting the delivery end of said web, the combination of a knife edge carried by the carriage and about which the delivery end of the web passes, means for angular adjustment of said knife edge comprising worm and segment gear and means for longitudinal adjustment of said knife edge comprising screw gear and a locking bolt for maintaining the position of adjustment.

2. In a machine for the manufacture of biscuits and the like the combination of a continuously moving feed web for cut biscuits, a continuously moving pan conveyor cooperating therewith and normally moving at the same speed, intermeshing gear wheels of substantially equal diameter with teeth formed on two arcs of different pitch for moving the pan conveyor at a faster speed than the biscuit web so that at one part of the revolution of said gear wheels the gear ratio is different to that at the other part whilst maintaining the required relative positions of the web and pans carried by the conveyor.

3. In a machine for the manufacture of biscuits and the like having a continuously moving feed web for cut biscuits, means for giving the delivery end of said web advancing and receding movements and guide members in which said delivery end has movement, the combination of cam operated levers adapted to impart rising and falling movements to said guides and delivery end.

4. In a machine for the manufacture of biscuits and the like having biscuit cutting mechanism, a continuously moving feed web for cut biscuits and a continuously moving pan conveyor co-operating therewith, the combination of epicyclic gearing associated with the pan conveyor, means for adjusting said gearing for synchronizing the movements of the pan conveyor with those of the cutting mechanism, and means adjacent the position at which the biscuits are delivered to the pans on the conveyor for controlling the adjustment of said epicyclic gearing.

5. In a machine for the manufacture of biscuits and the like having biscuit cutting mechanism, a continuously moving feed web for cut biscuits and a continuously moving pan conveyor cooperating therewith, the combination of epicyclic gearing associated with the pan conveyor, a clutch adapted to control the operation of the pan conveyor, and means adjacent the position at which the biscuits are delivered to the pans on the conveyor for operating said clutch to put the pan conveyor out of operation.

6. In a machine for the manufacture of biscuits and the like having biscuit cutting mechanism, a continuously moving feed web for cut biscuits and a continuously moving pan conveyor cooperating therewith, the combination of epicyclic gearing associated with the pan conveyor, means for adjusting said gearing for synchronizing the movements of the pan conveyor with those of the cutting mechanism, means adjacent the position at which the biscuits are delivered to the pans on the conveyor for controlling the adjustment of said epicyclic gearing, a clutch associated with the epicyclic gearing and adapted to control the operation of the pan conveyor, said clutch comprising members adapted to automatically return to clutching position at definite periods, and means operable from the delivery position of the biscuits from the web for maintaining the members of said clutch out of clutching position.

In witness whereof I have signed this specification.

GEORGE SAMUEL BAKER.